April 24, 1951  P. C. SMITH ET AL  2,550,610
NUCLEAR RADIATION DETECTOR
Filed March 30, 1949  3 Sheets-Sheet 3
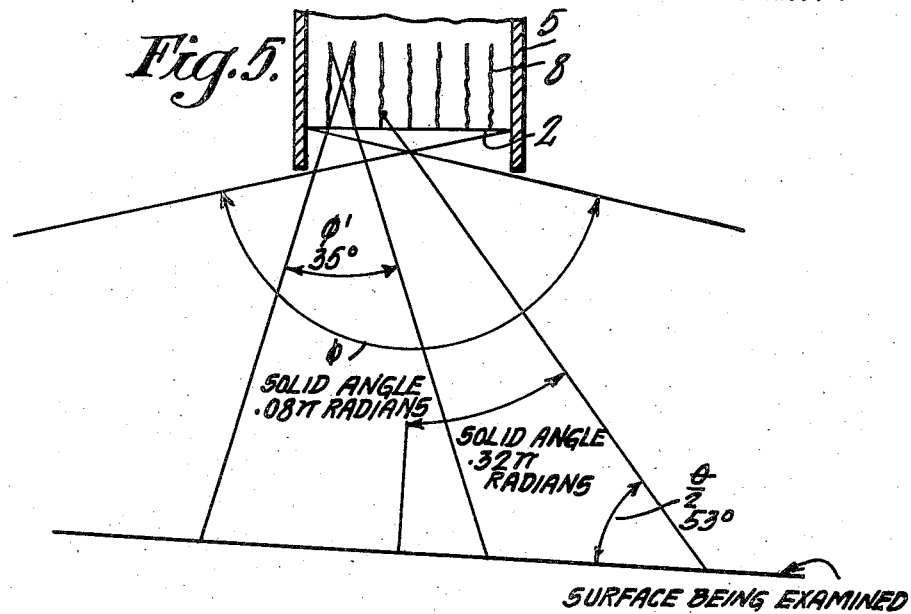
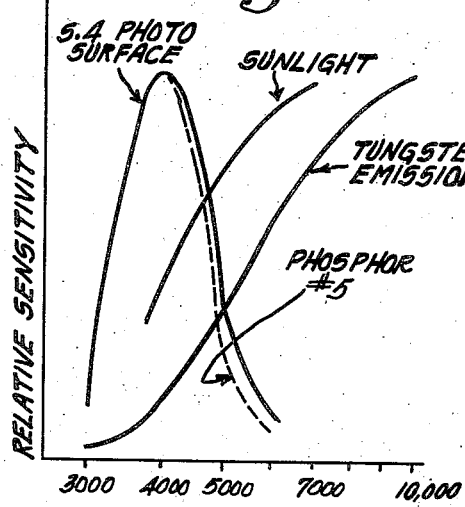
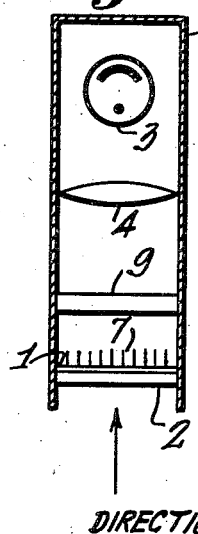
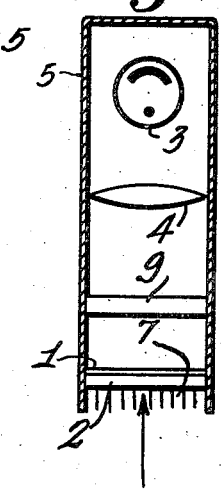
Inventors
Perry C. Smith
& John H. Reisner
Attorney Patented Apr. 24, 1951

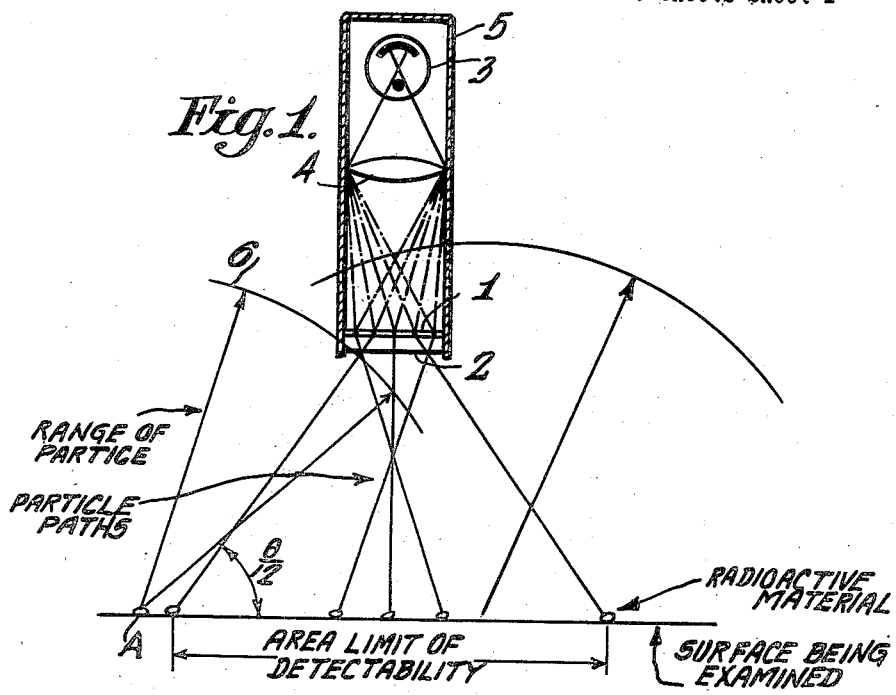

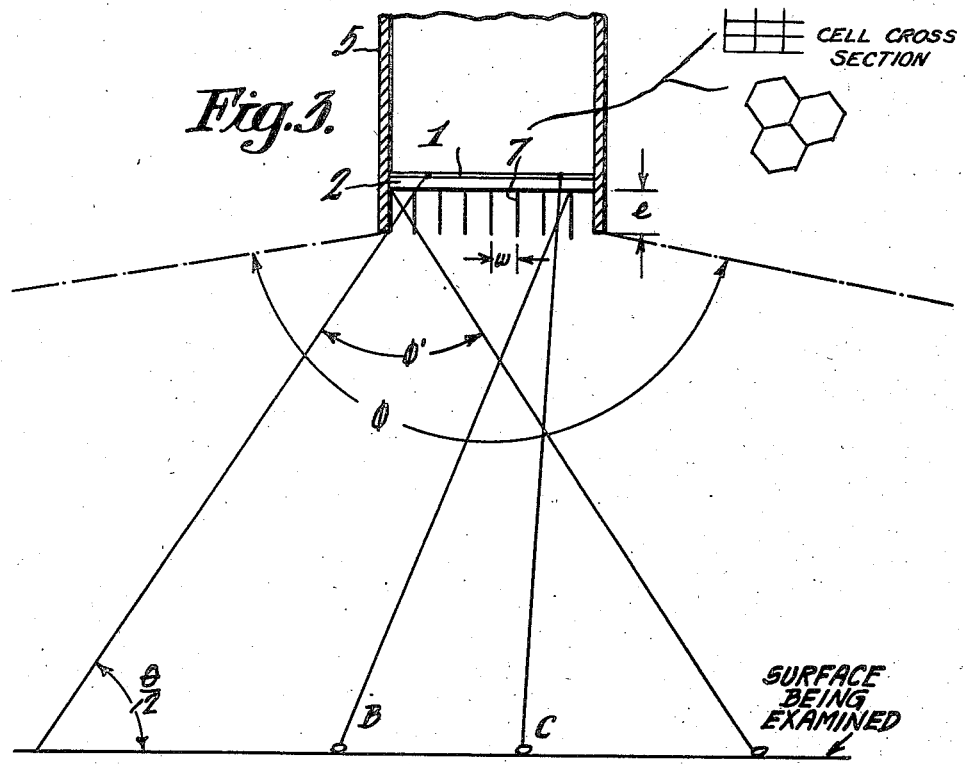
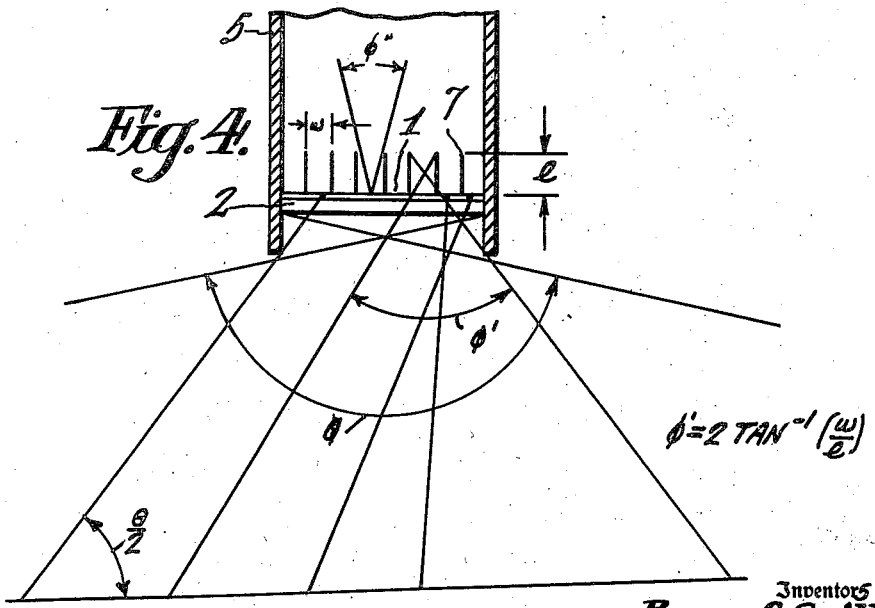

2,550,610

UNITED STATES PATENT OFFICE 2,550,610

NUCLEAR RADIATION DETECTOR

Perry C. Smith, Moorestown, and John H. Reisner, Haddonfield, N. J., assignors to Radio Corporation of America, a corporation of Delaware Application March 30, 1949, Serial No. 84,314

5 Claims. (Cl. 250—71)

This invention relates to the detection of energy and more specifically it relates to an improved form of detector for nuclear radiation or like energy in which the effect of unwanted radiations is rejected.

Radiation detectors have been utilized in the prior art which measured nuclear energy through the medium of phosphor screen detection and photocell pickup means. These devices however are not entirely satisfactory in that extraneous energy also causes response of the detection surfaces and therefore causes a small signal to noise ratio.

Our invention therefore contemplates novel means whereby unwanted radiations are rejected in a greater proportion than the wanted radiations, thereby giving an improved signal to noise ratio.

Accordingly it is an object of our invention to provide novel filter means for extraneous energy.

Another object is to provide a means for directly actuating a photocell with scintillations without such scintillations having to pass through a phosphor surface.

Another object of our invention is to provide an improved combination whereby energy in a narrow energy spectrum may be detected.

A still further object of our invention is to provide an improved form of the scintillating screen type of detector for nuclear energy or like radiation, which may be operated under conditions of high ambient light.

In order to illustrate our invention, a specific embodiment is described hereafter, wherein particle radiations are allowed to impinge upon a phosphor screen or scintillating crystal from which the resulting scintillations are detected by a photocell. This embodiment illustrates our invention in excluding extraneous light energy from the phosphor screen and the photocell by the use of novel filtering means. It is to be recognized however that this is only one specific embodiment of our invention and that the invention is not limited to the particular energy spectrum used here for purposes of illustration.

The features of our invention which we consider novel are set forth with particularity in the appended claims. The invention itself, however, both as to its organization and its method of operation, together with additional objects and advantages, will best be understood from the following description of a specific embodiment, when read in connection with the accompanying drawings wherein like reference characters designate similar parts throughout the several views, and in which:

Fig. 1 shows the manner in which particle radiation actuates a scintillation type energy detector of the prior art, Fig. 2 indicates the effect of extraneous energy upon the detector in Fig. 1, Fig. 3 is the arrangement shown in Fig. 2 to which directing vanes have been added, Fig. 4 shows a variation of Fig. 3, Fig. 5 exemplifies a modification of the directing vanes, Fig. 6 is a graphical representation of spectral response and energy curves, and Figs. 7 and 8 picture two assembled detectors which illustrate the manner of combining features of my invention according to the desired operating characteristics.

Referring more specifically to Fig. 1, there is shown a surface having radio active material thereupon which is emanating radiation of say, alpha particles. Hereinafter such radiation coming from nuclear or like reactions shall be called particles. These particles are then detected by means of a phosphor screen 1, exposed within the range of the particles which range is represented by the arc 6, drawn from the particle A. Between this screen and the radiation source a light opaque screen 2, transparent to the particles is interposed. A photo electric cell 3 is used as detector for scintillations caused when the particles impinge upon the phosphor surface, and a lens 4 focuses the scintillations upon the photocell. A light tight housing 5 envelops the photocell and is connected to the opaque screen 2.

As to operation of the detector in Fig. 1, particles striking a sensitive phosphor 1, e. g. ZnS with Cu activator, cause the emission of light which is focused by the lens 4 on the photocell 3. Scintillations activate the photocell which passes on intelligence to a suitable audible or visual indicator through appropriate electrical means.

It is to be noted that the height of the phosphor above the surface being examined determines the angular width in which the particles can be detected. A measure of this width is the angle $$\frac{\theta}{2}$$

shown. To fully understand this discussion, it is to be realized that particles generally travel a well defined distance radially from a source with no directional properties.

In order to prevent the photocell from being made operative by light radiations passing through the scintillating screen, a thin light opaque coat may be evaporated upon the phosphor. This coat must be light opaque and yet thin enough to present a minimum barrier or stopping agent for the particles with respect to the scintillating screen.

Since impact with matter is the means of stopping such particles, it is necessary to make screens of materials composed of elements of low atomic number, e. g., from lithium to aluminum.

In Fig. 2, the manner in which light enters the window of the detector assembly is shown. One means is direct reflection, the other diffuse scattering. The latter is more important, and it may be determined that this light entering the window area is proportional to the solid angle $\phi$. It is true that $\phi$ is greater than the angle subtended by the photocell and the window, however, light scattering from the phosphor causes a portion of all light in the solid angle $\phi$ to be scattered into the angle of the photocell.

In practice it is difficult to produce a thin light opaque barrier free of pinholes admitting part of this light. If the barrier is made thick enough to insure light opaqueness, it greatly reduces the effective distance from the source at which the particles may be detected.

The ratio of ambient light intensity in a room to the minimum scintillation light intensity from the radiation detecting element may be roughly estimated as $10^7$. When using detectors having particular spectral response characteristics, the best spectral response curve cannot be expected to change the ratio more than two orders. Obviously an opaque screen could be used to exclude the $10^5$ times phosphor light intensity available where the instruments are used. However, so far it has been impossible to make sufficiently thin screens without pinholes which still leak minute portions of the outside illumination onto the photocell.

It is one purpose of this invention to provide associated means for the reduction of "leakage" light to a negligible proportion so that scintillation type meters may be used in high ambient illumination.

When in operation, the scintillation survey meter generally operates close to a surface, e. g., not more than two inches away. Illumination striking the sensitive portions of such a survey meter must first come by reflection or scattering from the surface being surveyed as shown in Fig. 2. Since incident illumination is largely diffuse, the intensity of the spurious light is proportional to the solid angle $\phi$ subtended by the opening window of the device. By decreasing the solid angle for stray light more rapidly than the solid angle for activating particles, it is possible to improve the "signal to stray light ratio."

Fig. 3 therefore shows the same arrangement as Fig. 3 with the addition of directing vanes, 7. All intense light in an angle greater than $\phi'$ is absorbed in the vanes which have nonreflecting internal surfaces. The ratio of $\phi$ and $\phi'$ as shown is about 5. The vanes as chosen have the same value of $\theta$ as the case where no vanes are used. There is, however, a portion of the incident particles stopped by the vanes. See path B. This portion is never more than one half. The ratio, therefore, of particles to stray light has been improved by a factor of 2.5, by the use of such vanes. Proportions of the cellular vanes, 7, determine the signal to noise improvement by changing the ratio of angles $\phi'$ and $\phi$ and this ratio may be chosen to suit the particular requirements of such a detector. $\phi'$ is a function of the dimensions $w$ and $e$ shown in the diagram in the order, $$\phi' = 2 \tan-1 \frac{w}{e}$$

where the cell cross section is circular. The ratio $\phi/\phi'$ as shown is about 5.

In Fig. 4 the same angular set-up is shown as in Fig. 3, but the vanes follow the phosphor and opaque screens. Here the incident light illuminates the phosphor from an angle $\phi$ but scatters internally only in the angle $\phi''$ representing a decrease in total light of a factor of about twenty. All impacts by particles are counted but less of the emitted light reaches the photocell. The resulting improvement in signal to noise ratio is about five.

Since the light from impinging particles will be attenuated internally in the same degree as the scattered light, the effective over-all improvement in signal to noise ratio will be in the ratio $\phi/\phi'$ or about 5 where $\phi$ is the total solid angle of incidence to the screen and $\phi'$ is the solid angle subtended by the vanes.

The solid angle $\phi'$, which permits the entry of light when the vane system is used, is determined by the proportions of the vanes as indicated hereinbefore. When using round cell cross sections this relationship is:

$$\phi' = 2 \tan-1 \frac{w}{e}$$

where $w$ is the indicated width of the cell and $e$ is the length or depth of the cell in the direction substantially parallel to the direction of the radiation being measured.

If the non-reflecting substance used as a coating on the internal vanes is modified as in Fig. 5 to a non-reflecting phosphor coating 8, a further improvement of the signal to noise ratio will result as follows. The opaque screen 2 stops most of the light except that entering pinholes, but the phosphor absorbs much of the light entering these pinholes. When $\phi'$ is made 35° the activating particles entering the detector at less than 17.5° do not strike the phosphor. All particles entering at greater angles than 17.5° but less than 37° strike the phosphor obliquely causing the emission of light. This represents a loss of only 20% of the particles, but a much greater loss in the scattering from incident light. There is also a loss from the light emitted by the phosphor, but again this is in a smaller proportion than the less for scattered stray light.

It is to be noted that light from the scintillations does not have to pass through the phosphor surface but is directly transmitted to the photocell in this particular embodiment, thereby giving a larger signal output for any given particle collision.

The geometry shown in Fig. 5 was chosen as it represents the poorest ratio of signal to noise. When the spacing between probe and surface is decreased below that shown, the incidence of the particles increases. The angle $\theta/2 = 53°$ can be seen to be the smallest angle at which a particle emitted from a surface with a 7 cm. range can strike a screen 5.4 cm. away from the surface. The solid angle, within which emission of a particle will give rise to scintillation, will be measured from the normal to the screen or emitting surface and is the complement of $\phi/2$ or 37° as shown.

Since the particles are non-directional, we may expect a number of particles in a solid angle proportional to the size of that solid angle. In Fig.

5, $\phi$ is 35°, which effectively describes a cone whose elements are inclined 17.5° to the altitude of the cone. Such a cone forms a solid angle of 0.08 $\pi$ radians at its vertex. The solid angle formed by the effective cone, whose base angle is 53°, is 0.40 $\pi$ radians. Only those particles falling in the angles between the two cones are registered. The solid angle between the two effective cones is 0.32 $\pi$ radians. Thus, 0.08 $\pi$ radians out of 0.40 $\pi$ radians are useless, or 20% of the particles are not counted. The loss of registrations caused by stray light however is obviously increased in a much greater proportion because only the light incident in the 0.32 $\pi$ radians is registered excluding that light between $\phi$ and 0.32 $\pi$ radians or approximately 75%.

As shown hereinbefore, $\phi'$ is the important quantity in design. Where $\phi'$ is 35° as in Fig. 5, the ratio $w/e$ is 0.32. This is the condition where $w=2.5$ mm. and $e=7.5$ mm. $\phi$ depends primarily upon the width of the sensitive window of the probe and of the length of the lip extending beyond the surface 2. The width of the probe window shown in Fig. 4 is 0.75 inch while the lip is 0.125 inch. This gives a $\phi=160°$ as shown.

Fig. 6 shows the effect of employing spectral emission, response and energy characteristics. When the use of a photo surface having a narrow spectral response, e. g., RCA S-4, and a corresponding phosphor surface, e. g., RCA#5, the response at 3500 Å. will be maximum. An optical light filter, 9 in Figs. 7 and 8, also peaked at 3500 Å., may be used. Under such conditions the signal to noise ratio may be improved several fold in sunlight and to a great degree in tungsten lighted areas. It is to be recognized however these particular surfaces and values are merely used to illustrate the means of eliminating unwanted energy, and that the invention is not to be restricted to such values.

Complete assemblies are shown in Figs. 7 and 8, using vanes to improve the signal to noise ratio and filters to pass the strong energy band to the exclusion of stray energies. These are only two distinct combinations and it is obvious that in the light of our disclosure that improved results may be realized by different combinations such as using vanes both preceding and following the phosphor.

It should be pointed out that the calculations contained herein are not exact but are estimates frequently not taking into account complicated geometry which might bring about minor modification of the estimated values.

Our invention shows a novel vane system used as an energy filter in combination with components having particular spectral energy response, however, it is not intended to be limited to the illustrated embodiments, and there may be suggested by our disclosure to those skilled in the art certain modifications which will not necessarily constitute a departure from our invention.

Having thus fully described the nature, construction and operation of our invention, we wish to secure by Letters Patent and claim:

1. A radiation detector comprising in combination, a substance responsive to said radiation, detection means for said response, a filter which conducts said radiation interposed between said radiation and said responsive substance, and directive vanes substantially parallel to said radiation having said substance as a surface coating exposed to said radiation and being located between said radiation and said detector.

2. In combination, a radiation source, a substance responsive to said radiation having a substantially non-reflecting surface, cellular vanes mounted substantially parallel to said radiation coated with said substance, and means for detecting said response.

3. A radiation detector comprising in combination, cellular vanes substantially parallel to said radiation having dimensions whereby wide angle light energy is rejected, surface coating on said vanes of substantially non-reflecting substance responsive to said radiation, detection means for said response, filter means interposed between said vanes and said radiation and light opaque housing means connecting said filter and said detector.

4. The combination as recited in claim 2, having an optical light filter means interposed between said radiation and said detecting means.

5. The combination as recited in claim 2, having an optical filter means interposed between said vanes and said detecting means.

PERRY C. SMITH.
JOHN H. REISNER.

REFERENCES CITED

The following references are of record in the file of this patent:

UNITED STATES PATENTS

| Number | Name | Date |
| --- | --- | --- |
| 2,182,987 | Hopkins | Dec. 12, 1939 |
| 2,189,623 | Bourland | Feb. 6, 1940 |
| 2,221,374 | Farnsworth | Nov. 12, 1940 |

OTHER REFERENCES

A New Precision X-Ray Spectrometer, by W. Soller, Physical Review, vol. 24, 1924, pp. 158–167.